(12) United States Patent
Lefebvre et al.

(10) Patent No.: US 11,549,396 B2
(45) Date of Patent: Jan. 10, 2023

(54) MID-TURBINE FRAME FOR GAS TURBINE ENGINE

(71) Applicant: PRATT & WHITNEY CANADA CORP., Longueuil (CA)

(72) Inventors: Guy Lefebvre, St.-Bruno-de-Montarville (CA); John Pietrobon, Outremont (CA); Eric Langevin, Lery (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 520 days.

(21) Appl. No.: 16/680,559

(22) Filed: Nov. 12, 2019

(65) Prior Publication Data

US 2021/0140344 A1    May 13, 2021

(51) Int. Cl.

| F01D 25/16 | (2006.01) |
| F01D 9/06 | (2006.01) |
| F01D 25/24 | (2006.01) |
| F01D 25/28 | (2006.01) |

(52) U.S. Cl.
CPC ........... *F01D 25/162* (2013.01); *F01D 9/065* (2013.01); *F01D 25/24* (2013.01); *F01D 25/28* (2013.01); F05D 2220/323 (2013.01); F05D 2220/3213 (2013.01); F05D 2230/60 (2013.01); F05D 2240/12 (2013.01); F05D 2240/55 (2013.01); F05D 2260/20 (2013.01)

(58) Field of Classification Search
CPC ...... F01D 25/12; F01D 25/125; F01D 25/162; F01D 25/24; F01D 25/28; F01D 25/18; F01D 9/065; F01D 5/08; F01D 5/081–088; F05D 2220/3213; F05D 2220/323; F05D 2240/12; F05D 2240/55; F05D 2260/20
See application file for complete search history.

(56) References Cited

U.S. PATENT DOCUMENTS

| 8,371,127 | B2 | 2/2013 | Durocher et al. | |
| 9,279,341 | B2 * | 3/2016 | Durocher | F01D 9/065 |
| 9,803,501 | B2 | 10/2017 | Wang | |
| 10,087,782 | B2 | 10/2018 | Wang et al. | |
| 2010/0275572 | A1 * | 11/2010 | Durocher | F01D 25/18 |
| | | | | 60/39.08 |
| 2010/0303610 | A1 | 12/2010 | Wang et al. | |
| 2011/0079019 | A1 * | 4/2011 | Durocher | F01D 11/001 |
| | | | | 60/796 |

* cited by examiner

*Primary Examiner* — Loren C Edwards
(74) *Attorney, Agent, or Firm* — Norton Rose Fulbright Canada LLP

(57) ABSTRACT

A mid-turbine frame (MTF) assembly having: an outer case circumferentially extending around a central axis; an outer ring secured to the outer case and disposed radially inwardly of the outer case relative to the central axis; an inner case structurally connected to the outer case and disposed radially inwardly of the outer ring relative to the central axis; a main plenum circumferentially extending around the central axis and located between the outer case and the outer ring, the main plenum having an inlet fluidly connectable to a source of cooling air, a first outlet fluidly connected to a secondary plenum between the main plenum and the inner case, a second outlet configured to be fluidly connected to a rotor cavity of the low-pressure turbine, and a third outlet configured to be fluidly connected to a plenum surrounding a containment ring of the low-pressure turbine.

20 Claims, 5 Drawing Sheets

MID-TURBINE FRAME FOR GAS TURBINE ENGINE

TECHNICAL FIELD

The application relates generally to gas turbine engines and, more particularly, to systems and methods to cool components of turbine sections of such engines.

BACKGROUND OF THE ART

It is known to provide a mid-turbine frame assembly between high and low pressure turbine (HPT and LPT) rotor assemblies to support bearings and to transfer loads radially outwardly to a core engine casing. The mid-turbine frame assembly typically comprises a mid-turbine frame supporting an annular inter-turbine duct therein. The inter-turbine duct is defined between outer and inner duct walls which are interconnected by a plurality of radial hollow struts, thereby forming an annular hot gas path to convey the working fluid from the HPT to the LPT. The inter-turbine duct and the hollow struts are subjected to high temperatures and therefore cooling air is introduced around the inter-turbine duct and into the hollow struts to cool the same.

SUMMARY

In one aspect, there is provided a mid-turbine frame (MTF) assembly configured to be disposed between a high-pressure turbine and a low-pressure turbine of a gas turbine engine, comprising: an outer case circumferentially extending around a central axis; an outer ring secured to the outer case and disposed radially inwardly of the outer case relative to the central axis; an inner case structurally connected to the outer case and disposed radially inwardly of the outer ring relative to the central axis; a main plenum circumferentially extending around the central axis and located between the outer case and the outer ring, the main plenum having an inlet fluidly connectable to a source of cooling air, a first outlet fluidly connected to a secondary plenum between the main plenum and the inner case, a second outlet configured to be fluidly connected to a rotor cavity of the low-pressure turbine, and a third outlet configured to be fluidly connected to a plenum surrounding a containment ring of the low-pressure turbine.

In another aspect, there is provided a gas turbine engine comprising a mid-turbine frame (MTF) assembly disposed between a high-pressure turbine and a low-pressure turbine, the MTF assembly having: an outer case circumferentially extending around a central axis; an outer ring secured to the outer case and located radially inwardly of the outer case relative to the central axis; an inner case structurally connected to the outer case and disposed radially inwardly of the outer case relative to the central axis; a main plenum circumferentially extending around the central axis and located between the outer case and the outer ring, the main plenum having an inlet fluidly connected to a compressor of the gas turbine engine, a first outlet fluidly connected to a secondary plenum between the main plenum and the inner case, a second outlet fluidly connected to a rotor cavity of the low-pressure turbine, and a third outlet fluidly connected to a plenum surrounding a containment ring of the low-pressure turbine.

In yet another aspect, there is provided a method of supplying cooling air to a mid-turbine frame (MTF) assembly located between a high-pressure turbine and a low-pressure turbine of a gas turbine engine, the MTF assembly having inner and outer cases having therebetween inner and outer walls defining a core flow path, the method comprising: receiving cooling air within a main plenum located radially inward of the outer case; circulating the cooling air from the main plenum to a rotor cavity of the low-pressure turbine and circulating the cooling air from the main plenum to a cavity disposed around a containment ring of the low-pressure turbine; and circulating the cooling air from the main plenum to a secondary plenum for pressurizing first seals located between the outer case and the outer wall and second seals located between the inner case and the inner wall.

DESCRIPTION OF THE DRAWINGS

Reference is now made to the accompanying figures in which.

DETAILED DESCRIPTION

Figure 1:
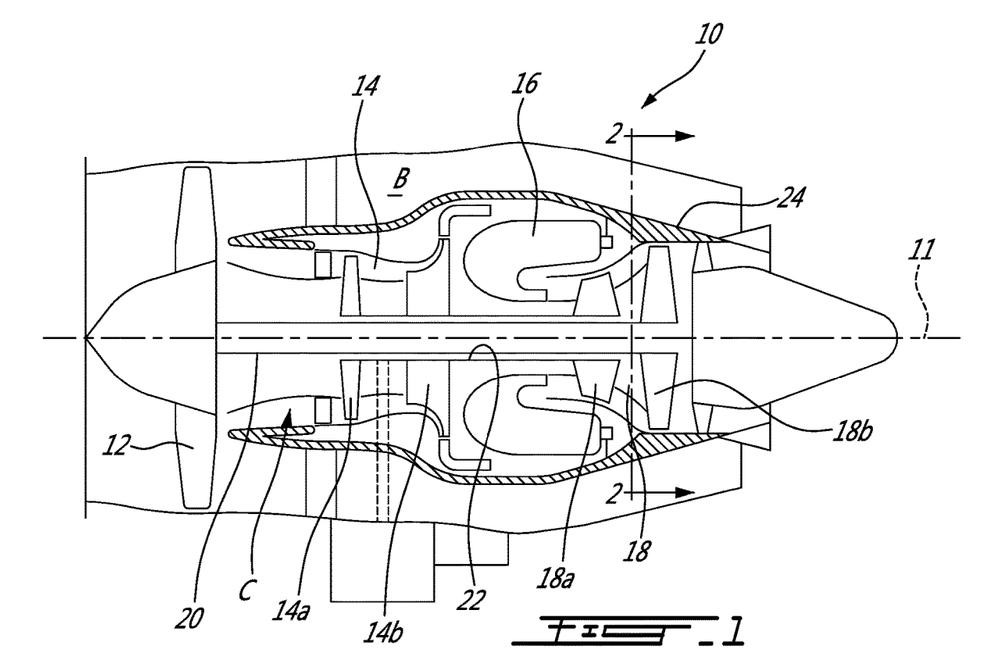
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11 of the engine 10. The gas turbine engine 10 includes a core flow path C and a bypass flow path B disposed radially outwardly of the core flow path C.

In the embodiment shown, the gas turbine engine 10 includes a high-pressure spool and a low-pressure spool. The low-pressure spool includes a low-pressure compressor 14a of the compressor section 14 and a low-pressure, or power, turbine 18b of the turbine section 18. The high-pressure spool includes a high-pressure compressor 14b of the compressor section 14 and a high-pressure turbine 18a of the turbine section 18. The low-pressure spool includes a low-pressure shaft 20 that connects the low-pressure compressor 14a to the low-pressure turbine 18b. The high-pressure spool includes a high-pressure shaft 22 that connects the high-pressure compressor 14b to the high-pressure turbine 18a. The fan 12 may be connected to the low-pressure shaft 20. The gas turbine engine 10 includes a core casing 24 that circumferentially extends all around the central axis 11 of the engine and that is used for securing the engine 10 to an aircraft.

The shafts 20, 22 are rotatably supported by bearings and a plurality of structural components of the engine are used to transmit the loads from the shafts 20, 22 and the bearings to the core casing 24 of the engine 10. One of those structural components includes a mid-turbine frame (MTF) assembly 26, which is described in detail herein below.

Referring to FIGS. 1-4, the mid-turbine frame (MTF) assembly 26 is located between the high-pressure turbine 18a and the low-pressure turbine 18b. The mid-turbine frame assembly 26 is used for supporting bearings 28, which rotatably support the low-pressure shaft 20 of the gas turbine engine 10, and to transfer loads radially outwardly to the core casing 24 of the gas turbine engine 10. The core flow path C is located radially inwardly of the core casing 24 relative to the central axis 11.

The bearings 28 may be located within a bearing housing 30. The MTF assembly 26 is located radially outwardly of the bearing housing 30 and is secured thereto to allow the loads to be transmitted from the shaft 20 of the engine 10 to the core casing 24. The bearing housing 30 defines a cavity for containing the bearings 28; the cavity being in fluid communication with a source of lubricant S (FIG. 4) of a lubrication system of the gas turbine engine 10 for providing lubricant to the bearings 28. In the embodiment shown, service lines L (FIG. 4) are used to fluidly connect the bearing housing 30 to the source of lubricant S.

The MTF assembly 26 further includes an outer case 32 that is secured to the core casing 24 of the gas turbine engine 10. The outer case 32 defines aperture 32a that are used to receive the service lines L therethrough. The outer case 32 extends circumferentially all around the central axis 11. The outer case 32 may have a structural function as it may be able to transmit loads from the bearings 28 to the core casing 24. The outer case 32 may further be used to delimit plenums that receive cooling air to be distributed to components in need of cooling. More detail about these plenums are presented herein below.

The MTF assembly 26 further includes an outer ring 34 that, in the embodiment shown, is secured to the outer case 32 via an annular flange 34a of the outer ring 34. The outer ring 34 defines a plurality of apertures 34b. Some of the apertures 34b, two in the embodiment shown, are used to receive the service lines L therethrough. The outer ring 34 may have a free end opposite the annular flange 34a. A sealing member 36 may be disposed between the free end of the outer ring 34 and the outer case 32. The sealing member 36 may be a w-type seal. Any suitable seal may be used.

A main plenum 38 is defined radially between the outer case 32 and the outer ring 34. The sealing member 36 may prevent air from leaking out of the main plenum 38 via a gap between the free end of the outer ring 34 and the outer case 32. In the embodiment shown, the main plenum 38 extends circumferentially all around the central axis 11. The main plenum 38 is configured to receive cooling air therein and to distribute the cooling air independently to a plurality of locations in need of cooling air for proper operation.

Figure 9:
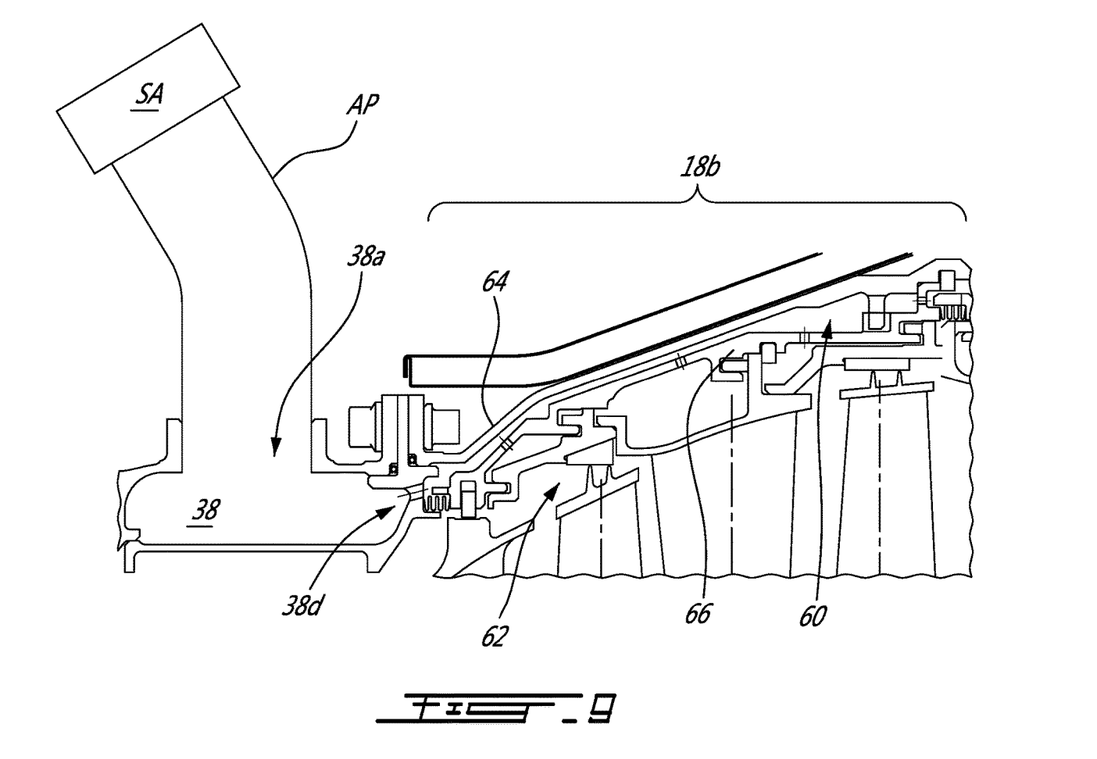
FIG. 9 is an enlarged portion of another portion of FIG. 3.

The main plenum 38 has at least one inlet 38a (FIG. 2), two inlets 38a in the embodiment shown, that are fluidly connected to a source of cooling air SA (FIG. 9) via suitable piping AP (FIG. 9). The source of cooling air may be, for instance, the compressor section 14 of the gas turbine engine 10. The two inlets 38a may be diametrically opposed to one another. In the embodiment shown, the inlets 38a of the main plenum 38 are defined by apertures 32b defined through the outer case 32.

The MTF assembly 26 further includes an inner case assembly 39 that is structurally connected to the bearing housing 30. The case assembly 39 includes a fore case component 39a, a rear case component 39b, and an inner ring 40 disposed between the fore and rear case components 39a, 39b.

Structural spokes 42 are secured to both of the inner case assembly 39 and the outer ring 34 at their respective opposite ends. The structural spokes 42 are circumferentially distributed around the central axis and are used to transmit loads from the inner ring 40 to the outer ring 34. In other words, the loads are transmitted from the shaft to the core casing 24 via the bearing housing 30, the inner case assembly 39, the structural spokes 42, the outer ring 34, and the outer case 32. In the embodiment shown, six structural spokes are used, but more or less spokes may be used without departing from the scope of the present disclosure.

Figure 2:
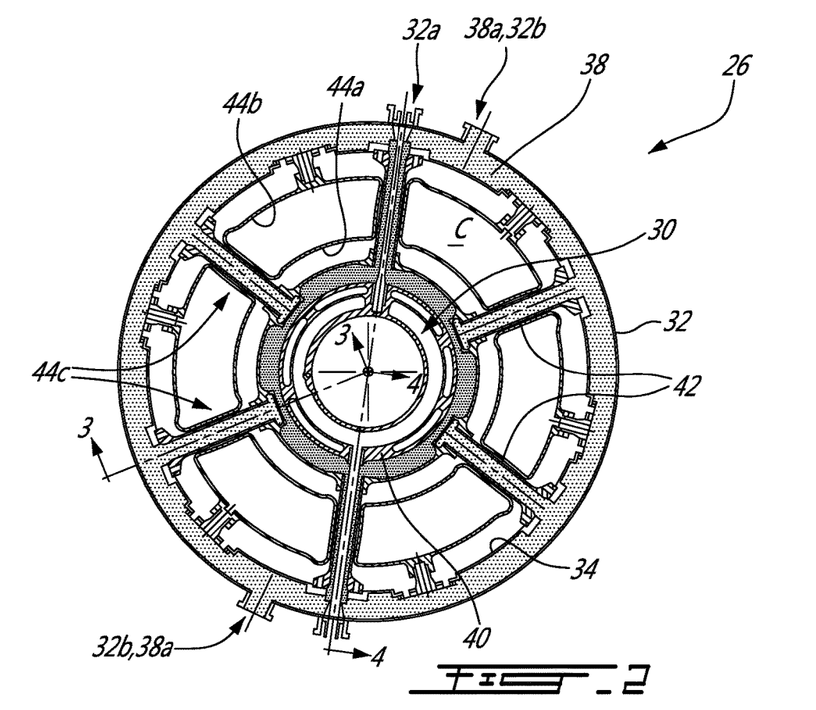
FIG. 2 is schematic cross-sectional view taken along line 2-2 of FIG. 1.
Figure 4:
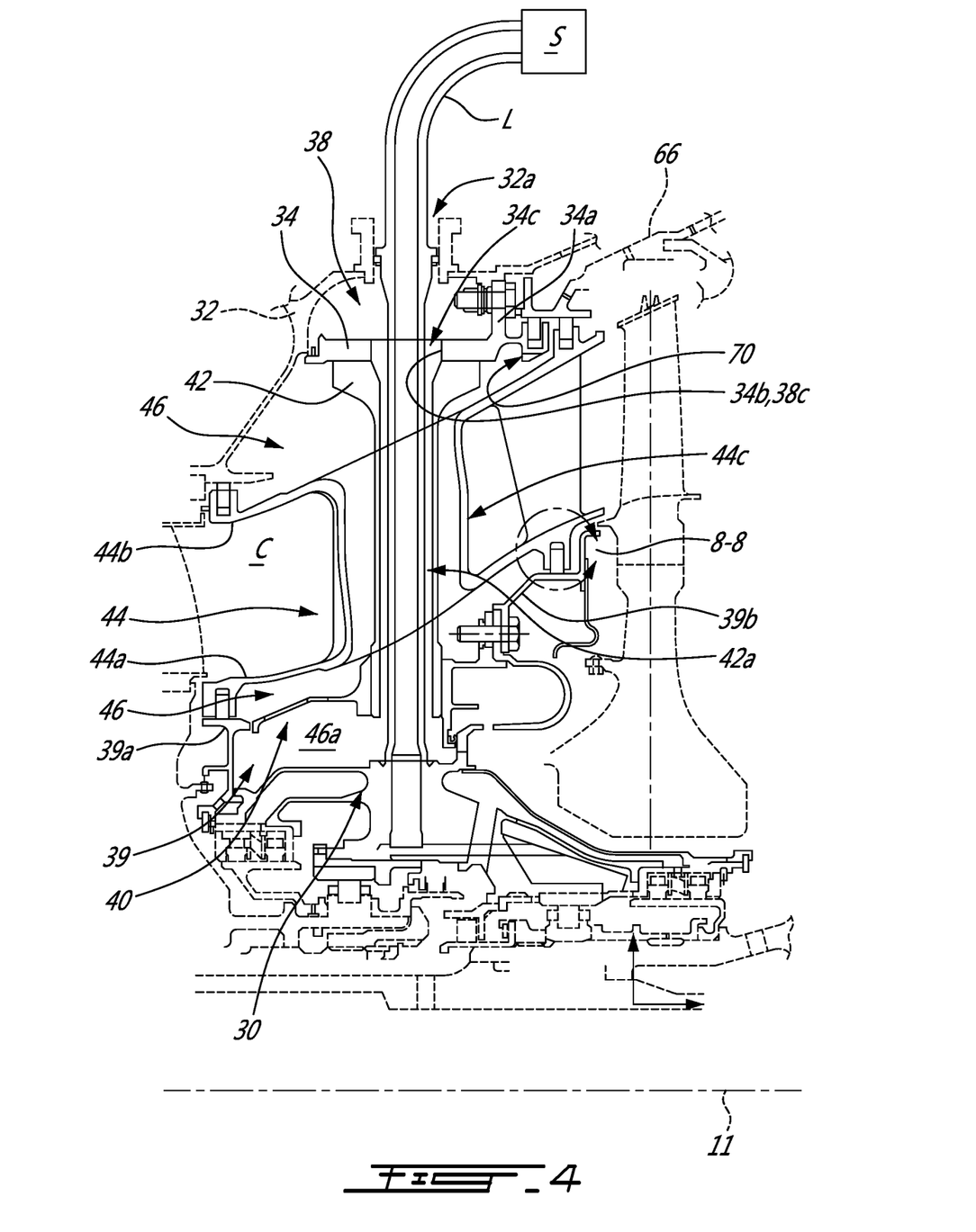
FIG. 4 is a schematic cross-sectional view taken along line 4-4 of FIG. 2.

Referring more particularly to FIGS. 2 and 4, the spokes 42 are hollow and may be configured to receive the service lines L therethrough. In the embodiment shown, two service lines L are used, each being received within a respective one of two of the spokes 42. As illustrated, the two spokes 42 that receive the service lines L are diametrically opposed to one another. This may allow for an even circumferential distribution of the lubricant within the bearing cavity of the bearing housing 30.

Referring back to FIGS. 2-4, the MTF assembly 26 further includes an integrated strut vane (ISV) 44. The ISV 44 is used to contain the flow within the core flow path C. The ISV 44 may be a monolithic piece of material. In the embodiment shown, the ISV 44 includes an inner wall 44a, an outer wall 44b disposed radially outwardly of the inner wall 44a, and struts 44c secured to both of the inner and outer walls 44a, 44b. The core flow path C is located between the inner and outer walls 44a, 44b. The struts 44c extend across the core flow path C. In the embodiment shown, the struts 44c are hollow and receive therein the spokes 42. The struts 44c of the ISV 44 may be streamlined and may offer less aerodynamic drag than if the spokes 42 were extending across the core flow path C without the struts 44c.

A secondary plenum 46 is defined between the outer case 32 and the bearing housing 30. The secondary plenum 46 has an inner section 46a, an outer section 46b, and middle sections 46c. The inner section 46a of the secondary plenum 46 is located between the inner wall 44a of the ISV 44 and the bearing housing 30. The outer section 46b of the secondary plenum 46 is located between the outer case 32 and the outer wall 44b of the ISV 44. The middle sections 46c of the secondary plenum 46 connects together the inner and outer sections 46a, 46b of the secondary plenum 46 and extends between the inner and outer walls 44a, 44b of the ISV 44. The secondary plenum 46 is separated from the main plenum 38 by the outer ring 34. The inner and outer sections 46a, 46b of the secondary plenum 46 may extend circumferentially all around the central axis 11. The middle sections 46c of the secondary plenum 46 are located within the struts 44c of the ISV 44. The middle sections 46c may include six middle sections 46, although more or less may be used, and may each have an annular shape extending all around longitudinal axes of the structural spokes 42. In other words, each of the middle sections 46c of the secondary plenum 46 may be defined between a respective one of the struts 44c of the ISV 44 and a respective one of the structural spokes 42. Therefore, the outer section 46b of the secondary plenum 46 is in fluid communication with the inner section 46a thereof via the middle sections 46c.

Figure 3:
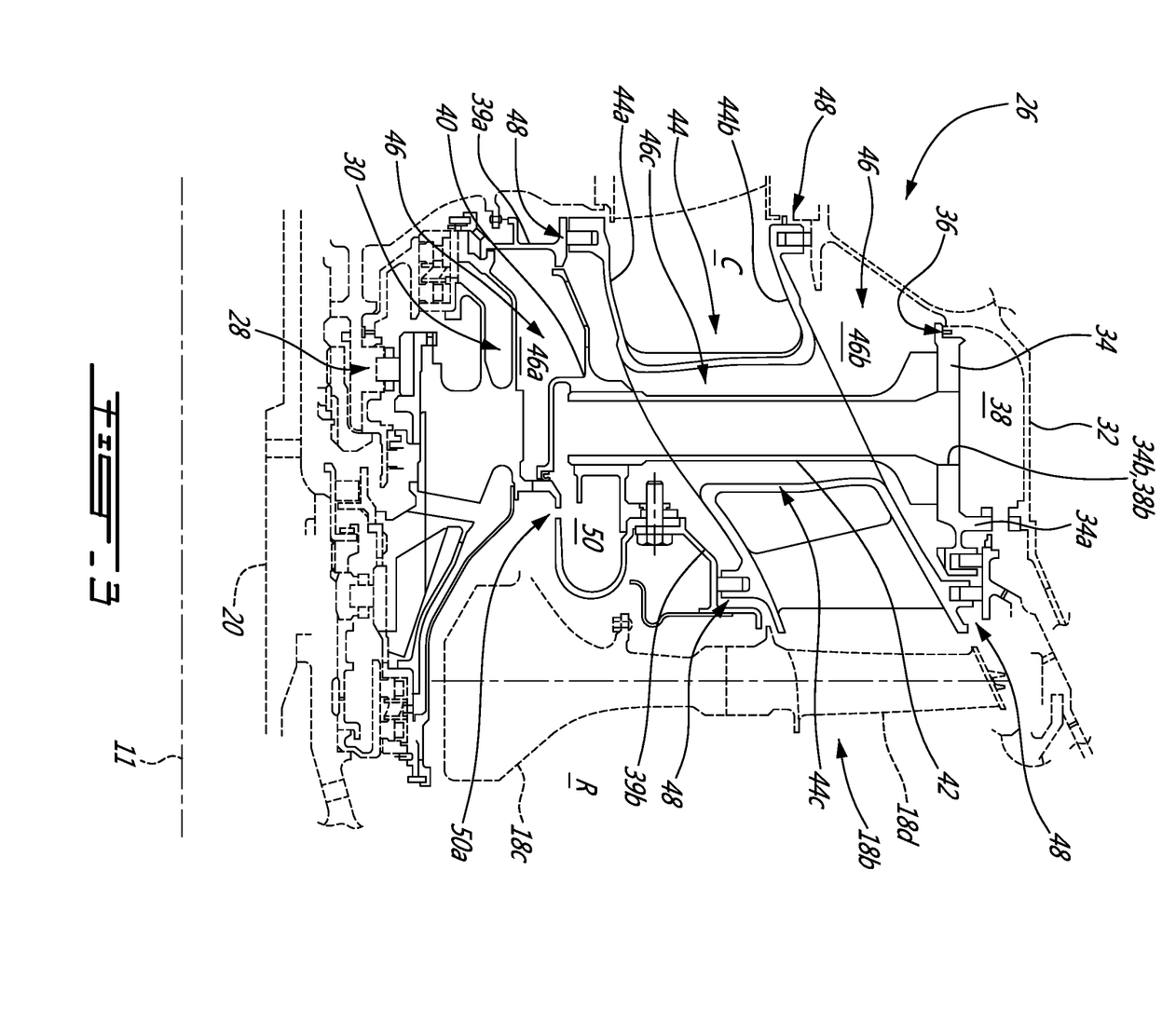
FIG. 3 is a schematic cross-sectional view taken along line 3-3 of FIG. 2.

Referring more particularly to FIG. 3, low-pressure turbine 18b includes one or more rotors each having a rotor disc 18c and rotor blades 18d secured to the rotor disc 18c. The rotor discs 18c are located within a rotor cavity R. In operation, the rotor disc 18c and the rotor blades 18d may become hot and cooling air may be required for keeping the rotor discs 18c and blades 18d at acceptable operation temperature. To do so, cooling air may be injected into the rotor cavity R.

Figure 5:
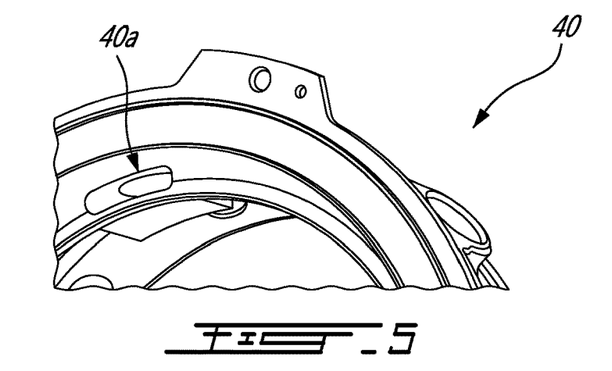
FIG. 5 is a schematic fragmented three-dimensional view of an inner ring of the gas turbine engine of FIG. 1.
Figure 6:
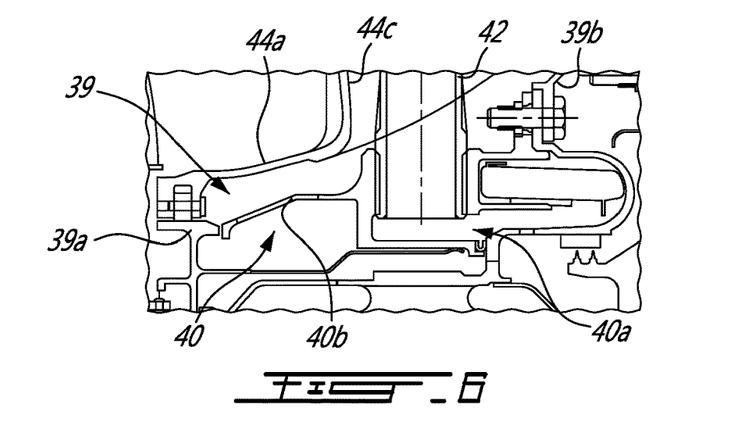
FIG. 6 is an enlarged view of a portion of FIG. 3.

Referring now to FIGS. 3 and 5-6, the cooling air is injected in the rotor cavity R from the main plenum 38. In the embodiment shown, the cooling air exits the main plenum 38 via a first outlet 38b of the main plenum 38. In the embodiment shown, the first outlet 38b of the main plenum 38 includes the apertures 34b defined through the outer ring 34 and that are free of the service lines L. The cooling air then circulates radially inwardly through the spokes 42 and is injected in the rotor cavity C by the inner ring 40. More specifically, and in the embodiment shown, the cooling air that is injected in the rotor cavity R circulates through the spokes 42 that are free of the service line L.

As shown more clearly on FIGS. 5-6, each of the spokes 42 that are free of the service line are secured to the inner ring 40 at locations registering with scoops 40a defined through the inner ring 40. The scoops 40a are apertures extending through the inner ring 40 and configured for allowing the air circulating through the spokes 42 to reach the rotor cavity R. In the embodiment shown, there is a plurality of injection points of the cooling air into the rotor cavity R, each of the injection points corresponding to a respective one of the scoops 40a. Herein, four scoops 40a are used and are distributed circumferentially around the central axis 11. Stated differently, the rotor cavity R is in fluid communication with the main plenum 38 via the scoops 40a of the inner ring 40 and via the spokes 42. More or less scoops may be used. In the depicted embodiment, the cooling air that reaches the scoops 40a defined through the inner ring 40 does not mix with the air circulating in the secondary plenum 46.

In the embodiment shown, the air that circulates through the scoops 40a enters a third plenum 50 defined conjointly by the inner ring 40 and the rear casing component 39b, which is secured to the inner ring 40. The air then escapes the third plenum 50 via an opening 50a before entering the rotor cavity R.

Figure 8:
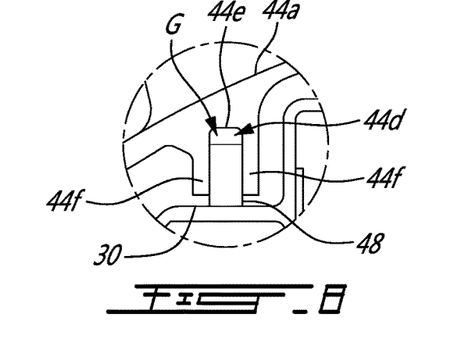
FIG. 8 is an enlarged view of another portion of FIG. 3.

Referring more particularly to FIGS. 3 and 8, the ISV 44 may be radially floating relative to the outer case 32 and the inner ring 40 such as to be able to expand with temperature increase while limiting thermal stress transmitted by the ISV 44 to the other structural elements, such as the outer case 32 and the inner ring 40. Moreover, it may be desired to avoid combustion gases circulating within the core flow path C to escape therefrom.

In the embodiment shown, four seals 48 are disposed at four ends of the ISV 44 to limit flow leakage from the core flow path C. In the embodiment shown, the seals 48 are sealing rings that circumferentially extend all around the central axis 11 and that are each received within a respective one of grooves 44d defined at axial ends of the inner and outer walls 44a, 44b of the ISV 44. Any suitable seals may be used. The seals 48 are biased against adjacent structural components of the MTF assembly 26 and radial gaps G are located between the seals 38 and bottom walls 44e of the grooves 44d to allow thermal expansion of the ISV 44.

In the embodiment shown, one of the seals 48 is in abutment against a sealing surface defined by the outer case 32; another one of the seals 48 is in abutment against a sealing surface defined by the fore case component 39a of the inner case 39; another one of the seals 48 is in abutment against a sealing surface defined by the rear casing component 39b of the inner case 39; and the other one of the seals 48 is in abutment against a sealing surface defined by a containment ring surrounding the low-pressure turbine 18b. More detail about the containment ring are presented below.

However, although the biasing engagement between the seals 48 and the adjacent structural components may be sufficient to limit leakages of the combustion gases out of the core flow path C, it may be required to provide a biasing engagement between the seals 48 and one of the lateral walls 44f defining the grooves 44d. In the embodiment shown, the biasing engagement is provided by creating a pressure differential between opposed sides of the seals 48; said pressure differential biasing the seals 48 against the lateral walls 44f.

Figure 7:
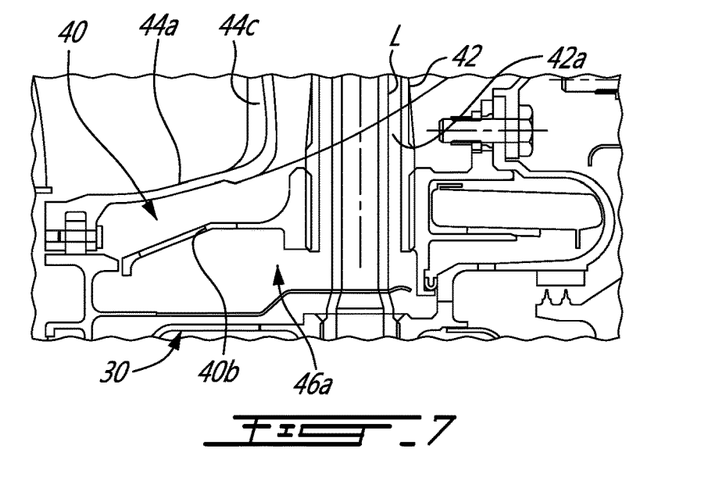
FIG. 7 is an enlarged view of another portion of FIG. 4.

Referring more particularly to FIGS. 4 and 7, for creating the pressure differential, the cooling air is injected in the secondary plenum 46. Since the cooling air 46 is bled from the compressor section 14, it may be at a higher pressure than a pressure outside the secondary plenum 46. In the embodiment shown, the cooling air, which is used herein as pressurizing air, is injected in the secondary plenum 46 from the main plenum 38. The main plenum 38 has a second outlet 38c via which the pressurizing air exits the main plenum 38 to be injected in the secondary plenum 46.

In the embodiment shown, the second outlet 38c corresponds to the apertures 34b defined through the outer ring 34 that receive therethrough the service lines L. In other words, and in the embodiment shown, the second outlet 38c of the main plenum 38 corresponds to annular openings 34c defined between peripheral walls of the apertures 34b of the outer ring 34 and the service lines L. The pressurizing air exits the main plenum 38 via the second outlet 38c, circulates radially inwardly within annular conduits 42a between the spokes 42 and the service lines L, and exits in the inner section 46a of the secondary plenum 46. The pressurizing air is therefore distributed circumferentially all around the central axis 11 within the inner section 46a of the secondary plenum 46, passes through apertures 40b defined through the inner ring 40, circulates through the middle sections 46c of the secondary plenum 46 and reaches the outer section 46b of the secondary plenum 46. The pressurizing air then reaches the four seals 48 thereby biasing them against the walls 44f circumscribing the grooves 44d (FIG. 8) to provide a sealing engagement therebetween.

In a particular embodiment, and in operation, the air supplied from the compressor section 14 and that is distributed within the secondary plenum 46 contributes in increasing a pressure differential between the secondary plenum 46 and the core flow path C. This pressure differential may contribute in increasing a sealing efficiency of the seals 48 and in limiting the combustion gases circulating within the core flow path C to be ingested within the secondary plenum 46.

Referring now to FIG. 9, the main plenum 38 further has a third outlet 38d that is in fluid communication with an annular plenum 60 disposed circumferentially all around the low-pressure turbine 18b. In the embodiment shown, the third outlet 38d is an aperture defined through the outer ring 34. The annular plenum 60 is part of a casing assembly 62 of the low-pressure turbine 18b. The casing assembly 62 may be as described in U.S. patent application published under no. US 2017/0198604 and filed on Dec. 8, 2016, the entire content of which is incorporated herein by reference. The casing assembly 62 includes an outer case 64 and a containment ring 66 located radially inwardly of the outer case 62. The annular plenum 60 is located radially between the outer case 64 and the containment ring 66. The containment ring 66 may be used for containing debris in case of malfunction of the low-pressure turbine 18b. These debris may be, for instance, pieces of blades of the turbine section 18. Supplying the cooling air to the annular plenum 60 may allow to maintain the containment ring 66 below a temperature threshold above which the containment ring may become less efficient in containing the debris.

Referring to FIGS. 4 and 9, the air contained in the secondary plenum 46 may be hot since it is in contact with the inner and outer walls 44a, 44b of the ISV 44, which are in contact with the hot combustion gases circulating in the core flow path C. In the embodiment shown, a secondary seal 70 is located between the outer ring 34 and the containment ring 66. Similarly to the seals 48 described above with reference to FIG. 8, the secondary seal 70 may be a sealing ring received within a groove, which, in the embodiment shown, is defined by the outer ring 34. In the depicted embodiment an upstream end of the containment ring defines a sealing surface in engagement with both of one of the seals 48 and the secondary seal 70. The secondary seal 70 may allow to limit the air contained within the secondary plenum 46 from circulating inside the annular plenum 60 adjacent the containment ring 66. Therefore, limiting the air from escaping the secondary plenum 46 and from circulating into the annular plenum 60 may ensure that the cooling air exiting the main plenum 38 and that circulates into the annular plenum 60 is not heated by the air of the secondary plenum 46, which is heated by the combustion gases circulating in the core flow path C. The secondary seal 70 may contribute in keeping the containment ring 66 at an acceptable temperature.

In the embodiment shown, the main plenum 38 feeds independently three uses of cooling/pressurization air. Under a FMEA (Failure Mode Effects Analysis) scenario, failure in one of these uses may not affect the other two uses, and may not result in an unsafe engine condition because the central supply plenum, that is the main plenum 38, may adequately feeds all of these three uses, including the failed one. As discussed above, these uses are: 1) pressurizing the secondary plenum 46 with the seals 48 to limit combustion gases from leaking inside the secondary plenum 46; 2) feeding cooling air to the rotor cavity R; and 3) feeding cooling air around the containment ring 66 to maintain it below a threshold temperature. The air supplied to all of these three uses comes directly from the main plenum 38 via respective outlets of the main plenum 38. In other words, there are a direct flow path between the main plenum 38 and each of these three uses so that malfunction, breakage, clog, or any problems that may arise with one of these three uses may not affect the circulation of the cooling/pressurization air to the remainder of these three uses.

For supplying the cooling air to the mid-turbine frame (MTF) assembly 26, the cooling air is received within the main plenum 38 located radially inward of the outer case 32. The cooling air is circulated from the main plenum 38 to the rotor cavity R of the low-pressure turbine 18b and the cooling air is circulated from the main plenum 38 to the cavity 60 disposed around the containment ring 66 of the low-pressure turbine 18b. The cooling air is circulated from the main plenum 38 to the secondary plenum 46 for pressurizing the seals 48 located between the outer case 32 and the outer wall 44b and between the inner case 39 and the inner wall 44a.

In the embodiment shown, circulating the cooling air from the main plenum 38 to the rotor cavity R includes circulating the cooling air through at least a first one of structural spokes 42 located between the inner and outer cases 39, 32. Circulating the cooling air from the main plenum 38 to the secondary plenum 46 may include circulating the cooling air through at least a second one of the structural spokes 42. Receiving the cooling air may include receiving the cooling air from the compressor section 16 of the gas turbine engine 10.

Embodiments disclosed herein include:

A. A mid-turbine frame (MTF) assembly configured to be disposed between a high-pressure turbine and a low-pressure turbine of a gas turbine engine, comprising: an outer case circumferentially extending around a central axis; an outer ring secured to the outer case and disposed radially inwardly of the outer case relative to the central axis; an inner case structurally connected to the outer case and disposed radially inwardly of the outer ring relative to the central axis; a main plenum circumferentially extending around the central axis and located between the outer case and the outer ring, the main plenum having an inlet fluidly connectable to a source of cooling air, a first outlet fluidly connected to a secondary plenum between the main plenum and the inner case, a second outlet configured to be fluidly connected to a rotor cavity of the low-pressure turbine, and a third outlet configured to be fluidly connected to a plenum surrounding a containment ring of the low-pressure turbine.

B. A gas turbine engine comprising a mid-turbine frame (MTF) assembly disposed between a high-pressure turbine and a low-pressure turbine, the MTF assembly having: an outer case circumferentially extending around a central axis; an outer ring secured to the outer case and located radially inwardly of the outer case relative to the central axis; an inner case structurally connected to the outer case and disposed radially inwardly of the outer case relative to the central axis; a main plenum circumferentially extending around the central axis and located between the outer case and the outer ring, the main plenum having an inlet fluidly connected to a compressor of the gas turbine engine, a first outlet fluidly connected to a secondary plenum between the main plenum and the inner case, a second outlet fluidly connected to a rotor cavity of the low-pressure turbine, and a third outlet fluidly connected to a plenum surrounding a containment ring of the low-pressure turbine.

Embodiments A and B may include any of the following elements, in any combinations:

Element 1: an inner wall and an outer wall delimiting a core flow path therebetween, the inner wall and the outer wall located between the outer case and the inner case, struts extending from the inner wall to the outer wall. Element 2: the inner wall, the outer wall, and the struts are components of an integrated strut vane (ISV). Element 3: the secondary plenum includes an outer plenum section between the outer ring and the outer wall, an inner plenum section between the inner case and the inner wall, and middle sections in fluid communication with both of the inner section and the outer section, the middle sections located inside the struts. Element 4: further comprising structural spokes being hollow and extending inside the struts. Element 5: wherein the secondary plenum is in fluid communication with the main plenum via at least a first one of the structural spokes and wherein the rotor cavity is configured to be in fluid communication with at least a second one of the structural spokes. Element 6: the inner case defines at least one scoop extending therethrough, the at least one scoop in fluid communication with the at least second one of the structural spokes, the main plenum configured to be in fluid communication with the rotor cavity via the at least second one of the structural spokes and the at least one scoop. Element 7: further comprising first seals between the outer case and the outer wall and second seals between the inner case and the inner wall, the first seals and the second seals configured to, in use, limit the cooling air from leaking out of the secondary plenum.

C. A method of supplying cooling air to a mid-turbine frame (MTF) assembly located between a high-pressure turbine and a low-pressure turbine of a gas turbine engine, the MTF assembly having inner and outer cases having therebetween inner and outer walls defining a core flow path, the method comprising: receiving cooling air within a main plenum located radially inward of the outer case; circulating the cooling air from the main plenum to a rotor cavity of the low-pressure turbine and circulating the cooling air from the main plenum to a cavity disposed around a containment ring of the low-pressure turbine; and circulating the cooling air from the main plenum to a secondary plenum for pressurizing first seals located between the outer case and the outer wall and second seals located between the inner case and the inner wall.

Embodiment C may include any of the following elements, in any combinations:

Element 8: circulating the cooling air from the main plenum to the rotor cavity includes circulating the cooling air through at least a first one of structural spokes located between the inner and outer cases. Element 9: circulating the cooling air from the main plenum to the secondary plenum includes circulating the cooling air through at least a second one of the structural spokes. Element 10: receiving the cooling air includes receiving the cooling air from a compressor section of the gas turbine engine.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A mid-turbine frame (MTF) assembly configured to be disposed between a high-pressure turbine and a low-pressure turbine of a gas turbine engine, comprising:
   an outer case circumferentially extending around a central axis and located radially outwardly of an annular gaspath, the annular gas path fluidly connected to an outlet of a combustor for directing combustion gases from the high-pressure turbine to the low-pressure turbine;
   an outer ring secured to the outer case and disposed radially inwardly of the outer case relative to the central axis and disposed radially outwardly of the annular gaspath;
   an inner case structurally connected to the outer case and disposed radially inwardly of the outer ring and of the annular gaspath relative to the central axis;
   a main plenum circumferentially extending around the central axis and located between the outer case and the outer ring, the main plenum located radially outwardly of the annular gaspath, the main plenum having
      an inlet fluidly connectable to a source of a cooling air,
      a first outlet fluidly connected to a secondary plenum between the main plenum and the inner case, the secondary plenum having an outer plenum section located radially outwardly of the annular gaspath, a second outlet configured to be fluidly connected to a rotor cavity of the low-pressure turbine, and
      a third outlet configured to be fluidly connected to an annular plenum surrounding a containment ring of the low-pressure turbine.

2. The MTF assembly of claim 1, wherein an inner wall and an outer wall delimit a core flow path therebetween, the inner wall and the outer wall located between the outer case and the inner case, and a plurality of struts extending from the inner wall to the outer wall.

3. The MTF assembly of claim 2, wherein the inner wall, the outer wall, and the struts are components of an integrated strut vane (ISV).

4. The MTF assembly of claim 2, wherein the outer plenum section of the secondary plenum is located between the outer ring and the outer wall, the secondary plenum having an inner plenum section between the inner case and the inner wall, and a plurality of middle sections in fluid communication with both of the inner section and the outer section, the plurality of middle sections located inside the struts.

5. The MTF assembly of claim 2, further comprising a plurality of structural spokes being hollow and extending inside the struts.

6. The MTF assembly of claim 5, wherein the secondary plenum is in fluid communication with the main plenum via at least a first one of the structural spokes and wherein the rotor cavity is configured to be in fluid communication with at least a second one of the structural spokes.

7. The MTF assembly of claim 6, wherein the inner case defines at least one scoop extending therethrough, the at least one scoop in fluid communication with the at least second one of the structural spokes, the main plenum configured to be in fluid communication with the rotor cavity via the at least second one of the structural spokes and the at least one scoop.

8. The MTF assembly of claim 2, further comprising a plurality of first seals between the outer case and the outer wall and a plurality of second seals between the inner case and the inner wall, the first seals and the second seals configured to, in use, limit the cooling air from leaking out of the secondary plenum.

9. A gas turbine engine comprising a turbine section having a high-pressure turbine and a low-pressure turbine, an annular gaspath extending through the turbine section, the annular gaspath fluidly connected to an outlet of a combustor, and a mid-turbine frame (MTF) assembly disposed between the high-pressure turbine and the low-pressure turbine, the MTF assembly having: an outer case circumferentially extending around a central axis; an outer ring secured to the outer case and located radially inwardly of the outer case relative to the central axis and disposed radially outwardly of the annular gaspath; an inner case structurally connected to the outer case and disposed radially inwardly of the outer case relative to the central axis; a main plenum circumferentially extending around the central axis and located between the outer case and the outer ring, the main plenum having an inlet fluidly connected to a compressor of the gas turbine engine, a first outlet fluidly connected to a secondary plenum between the main plenum and the inner case, the secondary plenum having an outer plenum section located radially outwardly of the annular gaspath, a second outlet fluidly connected to a rotor cavity of the low-pressure turbine, and a third outlet fluidly connected to an annular plenum surrounding a containment ring of the low-pressure turbine.

10. The gas turbine engine of claim 9, wherein an inner wall and an outer wall delimit a core flow path therebetween, the inner wall and the outer wall located between the outer case and the inner case, a plurality of struts extending from the inner wall to the outer wall.

11. The gas turbine engine of claim 10, wherein the inner wall, the outer wall, and the struts are components of an integrated strut vane (ISV).

12. The gas turbine engine of claim 10, wherein the outer plenum section is located between the outer ring and the outer wall, the secondary plenum having an inner plenum section between the inner case and the inner wall, and a plurality of middle sections in fluid communication with both of the inner section and the outer section, the plurality of middle sections located inside the struts.

13. The gas turbine engine of claim 10, further comprising a plurality of structural spokes being hollow and extending inside the struts.

14. The gas turbine engine of claim 13, wherein the secondary plenum is in fluid communication with the main plenum via at least a first one of the structural spokes and wherein the rotor cavity is configured to be in fluid communication with at least a second one of the structural spokes.

15. The gas turbine engine of claim 14, wherein the inner case defines at least one scoop extending therethrough, the at least one scoop in fluid communication with the at least second one of the structural spokes, the main plenum configured to be in fluid communication with the rotor cavity via the at least second one of the structural spokes and the at least one scoop.

16. The gas turbine engine of claim 10, further comprising a plurality of first seals between the outer case and the outer wall and a plurality of second seals between the inner case and the inner wall, the first seals and the second seals configured to, in use, limit a cooling air from leaking out of the secondary plenum.

17. A method of supplying the cooling air to the mid-turbine frame (MTF) assembly of claim 9 located between the high-pressure turbine and the low-pressure turbine of the gas turbine engine having the annular gaspath, the MTF assembly having the inner case and the outer case having therebetween an inner wall and an outer wall defining a core flow path, the method comprising:

receiving the cooling air within the main plenum located radially inward of the outer case;

circulating the cooling air from the main plenum to the rotor cavity of the low-pressure turbine and circulating the cooling air from the main plenum to a cavity disposed around the containment ring of the low-pressure turbine; and circulating the cooling air from the main plenum to the secondary plenum for pressurizing a plurality of first seals located between the outer case and the outer wall and a plurality of second seals located between the inner case and the inner wall, the secondary plenum having the outer plenum section located radially outwardly of the annular gaspath.

18. The method of claim 17, wherein circulating the cooling air from the main plenum to the rotor cavity includes circulating the cooling air through at least a first one of a plurality of structural spokes located between the inner case and the outer case.

19. The method of claim 18, wherein circulating the cooling air from the main plenum to the secondary plenum includes circulating the cooling air through at least a second one of the structural spokes.

20. The method of claim 17, wherein receiving the cooling air includes receiving the cooling air from a compressor section of the gas turbine engine.

* * * * *